United States Patent Office 2,877,272
Patented Mar. 10, 1959

2,877,272
MANUFACTURING PHOSPHINOBORINES

Anton B. Burg, Los Angeles, Calif., and Peter J. Slota, Jr., Munich, Germany, assignors, by mesne assignments, to American Potash & Chemical Corporation, a corporation of Delaware No Drawing. Application May 18, 1956
Serial No. 585,606

6 Claims. (Cl. 260—606.5)

This invention relates to a method of manufacture of phosphinoborines from phosphinyl halides of the type

where X is fluorine, chlorine or bromine, and either or both R substituents is an organic radical.

The process is particularly characterized by its directness and simplicity. For example, to form a phosphinoborine from a phosphinyl halide, a solution of a borohydride salt is slowly treated with a solution of the phosphinyl halide wtih suitable stirring and cooling. The resulting mixture is then heated to form the phosphinoborine. As suitable solvents, various ethers are useful, the solvent chosen depending in part upon the borohydride salt utilized. For example, we have successfully utilized diethyl ether when lithium borohydride was employed, or a polyether such as diethylene glycol dimethyl ether when sodium borohydride was employed. When a polyether is utilized as the solvent, the heating can occur at or below the refluxing temperature of the solvent. In any case, the complex formed is heated to a temperature whereat hydrogen is evolved and the phosphinoborine is formed from the complex present. A temperature of 170° C. usually suffices for this.

Following formation of the phosphinoborine, the solvent is removed by evaporation or distillation. The phosphinoborine can be isolated by sublimation or by crystallization from the alkali halide which is present, the method chosen being one appropriate to the properties of the specific phosphinoborine being prepared.

The practice of the invention will become further apparent from the following examples which are illustrative.

*Example 1.*—Dimethylphosphinyl chloride $$(CH_3)_2POCl$$

(7.3 g.) was dissolved in 40 ml. of dry diethyleneglycoldimethyl ether, as a solvent. The solution was placed in a dropping funnel and added drop-wise to a solution of 3 grams of sodium borohydride (NaBH$_4$) in 40 ml. of the same ether as a solvent contained in a 3-neck round-bottom flask fitted with a dry-nitrogen inlet, a suitable stirrer, and a cold-finger cooled by solid carbon dioxide. The highly exothermic reaction formed a white precipitate and evolved hydrogen. The flask now was heated to 170° C. and maintained at that temperature for 7.5 hours, after which there was no further evolution of gas. A droplet of liquid, found on the cold-finger, was identified as dimethylphosphine borine, (CH$_3$)$_2$PH.BH$_3$. The precipitate was collected on a sintered glass filter and identified as sodium chloride containing a small proportion of sodium borohydride. The filtered solution was evaporated in vacuo, leaving a very viscosous non-volatile liquid. This was heated at 170–185° C., in an evacuated flask fitted with a cold-finger, upon which was deposited a white solid and a small proportion of a difficultly volatile liquid. The white solid was purified by crystallization from methanol and recognized by its melting point (85° C.) as the trimer of dimethylphosphinoborine, [(CH$_3$)$_2$PBH$_2$]$_3$; a yield of 2.5 grams, representing 52% of the original dimethylphosphinyl chloride was obtained.

*Example 2.*—Diphenylphosphinyl chloride (23.7 g.) was dissolved in 100 ml. of dry diethyleneglycoldimethyl ether, as a solvent. The solution was placed in a dropping funnel and added drop-wise to a solution of 6 g. of sodium borohydride (NaBH$_4$) in 100 ml. of the same ether as solvent contained in the same apparatus described in Example 1. The highly exothermic reaction produced a white precipitate and evolved hydrogen. After the addition was complete, the mixture was heated to the reflux temperature until no further evolution of gas was observed. The solid, consisting of sodium chloride and unused sodium borohydride, was collected on a sintered glass filter. The filtered solution was evaporated in vacuo, leaving a non-volatile residue which, upon recrystallization from methyl alcohol produced a good yield of the crystalline trimer of diphenylphosphinoborine [(C$_6$H$_5$)$_2$PBH$_2$]$_3$.

*Example 3.*—Addition of 15.7 g. of cyclopentamethylenephosphinyl chloride, C$_5$H$_{10}$POCl dissolved in 50 ml. of dry diethyleneglycoldimethyl ether to 6 g. of NaBH$_4$ dissolved in 50 ml. of the same ether, contained in the apparatus described in Example 1, produced a white precipitate of sodium chloride, and hydrogen was evolved during the exothermic reaction. After the addition was complete, the mixture was heated to the reflux temperature until no further gas was evolved. After filtering off the solids and removal of the solvent from the filtrate, 4 g. of the trimer of cyclopentamethylenephosphinoborine, [(C$_5$H$_{10}$PBH$_2$]$_3$, was isolated by distillation. The yield was 36%, based upon the phosphinyl chloride.

*Example 4.*—Twenty-two and six-tenths grams of di-isoamylphosphinyl chloride dissolved in 75 ml. of dry diethyleneglycoldimethyl ether was slowly added to a solution containing 6 g. of NaBH$_4$ and 50 ml. of the same ether. The reaction was exothermic, producing a white precipitate of sodium chloride, and hydrogen was evolved. The mixture was heated to reflux temperature after the addition had been completed. When no further hydrogen was produced, the solids were removed by filtration and the filtrate distilled. Eight and one-half grams of the difficultly distillable trimer of di-isoamylphosphinoborine, [(C$_5$H$_{11}$)$_2$PBH$_2$]$_3$, was obtained. The yield was 46%, based upon the phosphinyl chloride.

*Example 5.*—To a solution of 6 g. of NaBH$_4$ dissolved in 50 ml. of dry diethyleneglycoldimethyl ether was added slowly 17.5 g. of phenylmethylphosphinyl chloride, C$_6$H$_5$(CH$_3$)POCl, in 50 ml. of the same ether. After the exothermic reaction had subsided, the mixture was heated to reflux temperature until no further evolution of gas was noticed. The solid produced was filtered from the solution and the filtrate subjected to vacuum distillation. A solid was obtained which, after recrystallization from methyl alcohol-benzene, amounted to 6.7 g. or 49% yield of the trimer of phenylmethylphosphinoborine [C$_6$H$_5$(CH$_3$)PBH$_2$]$_3$ based upon the phosphinyl chloride.

*Example 6.*—A solution consisting of 24.9 g. of dicyclohexylphosphinyl chloride, (C$_6$H$_{11}$)$_2$POCl, and 75 ml. of dry diethyleneglycoldimethyl ether was slowly added to 6 g. of NaBH$_4$ dissolved in 50 ml. of the same ether. A white precipitate of sodium chloride was formed along with the evolution of hydrogen. Upon completion of the addition, the reaction mixture was heated to reflux temperature until hydrogen evolution ceased. The solids were filtered off and the filtrate subjected to vacuum distillation. Nine and six-tenths grams of high boiling product was obtained. The trimer had a low melting point. Yield of di-cyclohexylphosphinoborine trimer, $[(C_6H_{11})_2PBH_2]_3$, was 45% based upon the phosphinyl chloride.

As reactants, one can employ any borohydride and any phosphinyl halide, the process being capable of wide application.

As pointed out in the paper appearing on pages 3872–7, vol. 75, Journal of the American Chemical Soc. (1953), authored by Anton B. Burg and Ross I. Wagner, entitled "Chemistry of P-B Bonding: The Phosphionoborines and Their Polymers," phosphinoborines are very stable. As also pointed out in our copending application, Serial No. 446,147, filed July 27, 1954, for "Phosphinoborine Compounds and Their Preparation," these polymers are useful as dielectrics.

We claim:

1. A process for the manufacture of a phosphinoborine comprising: contacting an alkali metal borohydride with a compound of the formula

wherein $R_1$ and $R_2$ are selected from the group consisting of lower alkyl, lower cycloalkyl and phenyl and X is a halogen selected from the group consisting of fluorine, chlorine and bromine, in an inert solvent, and heating said solution to produce said phosphinoborine.

2. The process of claim 1 wherein the alkali metal borohydride is sodium borohydride, wherein the phosphinyl halide is dimethylphosphinyl chloride and the product is a dimethylphosphinoborine polymer.

3. The process of claim 1 wherein the alkali metal borohydride is sodium borohydride, wherein the phosphinyl halide is diphenylphosphinyl chloride and the product is a diphenylphosphinoborine polymer.

4. The process of claim 1 wherein the alkali metal borohydride is sodium borohydride, wherein the phosphinyl halide is cyclopentamethylenephosphinyl chloride and the product is a cyclopentamethylenephosphinoborine polymer.

5. The process of claim 1 wherein the alkali metal borohydride is sodium borohydride, wherein the phosphinyl halide is isoamylphosphinyl chloride and wherein the product is a di-isoamylphosphinoborine polymer.

6. The process of claim 1 wherein the alkali metal borohydride is sodium borohydride, wherein the phosphinyl halide is phenylmethylphosphinyl chloride and the product is a phenylmethylphosphinoborine polymer.

References Cited in the file of this patent

Burg et al.: "American Chemical Society Journal," vol. 75 (1953), pages 3872–7.